United States Patent [19]

Brown, deceased et al.

[11] 3,886,282

[45] May 27, 1975

[54] NEMATOCIDAL N-ARYLTHIO S-HYDROCARBYL THIOCARBAMATES

[75] Inventors: Melancthon S. Brown, deceased, late of Berkeley, Calif.; by Gustave K. Kohn, administrator, Berkeley, Calif.

[73] Assignee: Chevron Research Company, San Francisco, Calif.

[22] Filed: Feb. 22, 1974

[21] Appl. No.: 444,625

Related U.S. Application Data

[62] Division of Ser. No. 150,860, June 1, 1971, Pat. No. 3,810,928.

[52] U.S. Cl. ............................. 424/300
[51] Int. Cl. ..................... A01n 9/12; A01n 9/20
[58] Field of Search ........................... 424/300

[56] References Cited
UNITED STATES PATENTS

| | | | |
|---|---|---|---|
| 3,276,855 | 10/1966 | Richter ........................ | 71/98 |
| 3,277,142 | 10/1966 | Zerbe et al. ................... | 424/300 |
| 3,301,885 | 1/1967 | Richter et al. ................. | 260/455 A |
| 3,344,153 | 9/1967 | Kuhle et al. ................... | 260/453 R |
| 3,546,343 | 12/1970 | Payne, Jr. et al. .............. | 424/300 |
| 3,609,175 | 9/1971 | Richter ........................ | 260/455 A |

*Primary Examiner*—Jerome D. Goldberg
*Assistant Examiner*—Allen J. Robinson
*Attorney, Agent, or Firm*—G. F. Magdeburger; John Stoner, Jr.; Raymond Owyang

[57] ABSTRACT

Compounds of the formula

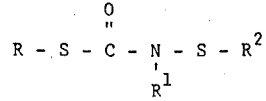

wherein R is alkyl, alkenyl, alkynyl or phenyl optionally substituted with halogen or alkyl groups; $R^1$ is hydrogen or alkyl; $R^2$ is phenyl optionally substituted with halogen or alkyl groups, find use as nematocides.

10 Claims, No Drawings

NEMATOCIDAL N-ARYLTHIO S-HYDROCARBYL THIOCARBAMATES

CROSS REFERENCE TO RELATED APPLICATIONS

This is a division of application Ser. No. 150,860, filed June 1, 1971, now U.S. Pat. No. 3,810,928.

BACKGROUND OF THE INVENTION

1. Field

The present invention relates to novel thiocarbamates, particularly N-arylthio S-hydrocarbyl thiocarbamates and their use in the control of nematodes and other pests.

2. Description of the Invention

The novel compounds of this invention may be represented by the formula

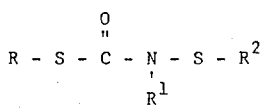

wherein R is alkyl of 1 to 6 carbon atoms, alkenyl of 2 to 6 carbon atoms, alkynyl of 2 to 6 carbon atoms or phenyl substituted with 0 to 2 halogen atoms of atomic number 9 to 35 (fluorine, chlorine or bromine) or alkyl groups of 1 to 5 carbon atoms; $R^1$ is hydrogen or alkyl of 1 to 4 carbon atoms and $R^2$ is phenyl substituted with 0 to 2 halogen atoms of atomic number 9 to 35 or alkyl groups of 1 to 5 carbon atoms.

Preferably R is alkyl of 1 to 6 carbon atoms or phenyl substituted with 0 to 2 halogen atoms of atomic number 9 to 35 or alkyl groups of 1 to 5 carbon atoms; $R^1$ is alkyl of 1 to 4 carbon atoms and $R^2$ is phenyl substituted with 0 to 2 halogen atoms of atomic number 9 to 35 or alkyl groups of 1 to 5 carbon atoms.

More preferably R is alkyl of 1 to 4 carbon atoms; $R^1$ is alkyl of 1 to 4 carbon atoms, more preferably methyl, and $R^2$ is halophenyl, particularly chlorophenyl.

Representative groups which R may represent include methyl, ethyl propyl, butyl, pentyl, hexyl, vinyl, allyl, 3-butenyl, propargyl, phenyl, 4-chlorophenyl, 2-chlorophenyl, 3-bromophenyl, 2,4-difluorophenyl, 3,5-dichlorophenyl, 4-methylphenyl, 4-n-butylphenyl, 2-chloro-4-methylphenyl, 3-sec-butylphenyl, 3-[2'-amyl]phenyl, etc.

Representative groups which $R^1$ may represent include methyl, ethyl, n-propyl, isopropyl, n-butyl, etc.

Representative groups which $R^2$ may represent include phenyl, 4-chlorophenyl, 4-bromophenyl, 4-fluorophenyl, 2-chlorophenyl, 2,4-dichlorophenyl, 3,5-dibromophenyl, 3,5-dimethylphenyl, 2-methyl-4-ethylphenyl, 2-chloro-3-methylphenyl, 4-t-butylphenyl, 3-sec-butylphenyl, 3-[2'-amyl]phenyl, etc.

Typical compounds of this invention are N-phenylthio S-methyl thiocarbamate, N-4-methylphenylthio S-vinyl thiocarbamate, N-2-methyl-4-chlorophenylthio-N-methyl S-allyl thiocarbamate, N-4-chlorophenylthio-N-methyl S-phenyl thiocarbamate, N-4-fluorophenylthio-4-methyl S-4-chlorophenyl thiocarbamate, N-2,3-dichlorophenylthio-N-ethyl S-4-methylphenyl thiocarbamate, N-4-chlorophenylthio-N-methyl S-n-propyl thiocarbamate, N-2-chlorophenylthio-N-methyl S-n-butyl thiocarbamate, N-4-chlorophenylthio-N-ethyl S-n-butyl thiocarbamate, N-2-fluorophenylthio-N-methyl S-n-butyl thiocarbamate, N-4-bromophenylthio-N-methyl S-n-butyl thiocarbamate, N-4-chlorophenylthio-N-ethyl S-n-butyl thiocarbamate, N-4-chlorophenylthio-N-methyl S-n-pentyl thiocarbamate, N-4-chlorophenylthio-N-methyl S-isobutyl thiocarbamate, N-4-chlorophenylthio-N-methyl S-sec-butyl thiocarbamate, etc.

The compounds of this invention are prepared by the reaction of an appropriate thiocarbamate with an equal molar amount of an appropriate arylsulfenyl chloride. The latter compound may be used in a slight excess of about 1 to 5 percent over a molar amount. The reaction is as follows:

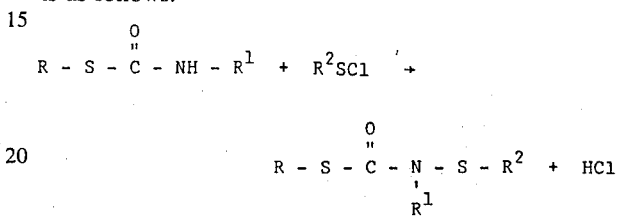

wherein R, $R^1$ and $R^2$ have the same meaning as above.

This reaction is carried out in aprotic solvents, such as dimethylformamide or tetrahydrofuran. The solvent is used in a quantity ranging from 3 to 10 times the weight of the thiocarbamate feedstock. The reaction is carried out at low temperatures; preferably the initial mixing is at temperatures in the range of 0° to 15°C., followed by further contact at temperatures in the range of 15° to 25°C. After the initial mixing, the reaction is continued for an additional 15 to 150 minutes before workup.

It is necessary to have a basic material present in the reaction to scavenge the by-product hydrogen chloride. This base is preferably a solvent soluble organic amine, such as triethylamine, pyridine, quinuclidine, N-methylmorpholine, etc. These basic substances are used in an amount at least equivalent to the sulfenyl chloride reactants.

Product isolation is accomplished by adding cold water to the reaction mixture and extracting the resulting mixture with diethyl ether. After washing and drying of the ether extracts, the ether is removed by evaporation to give the crude product. This crude material may be used as such, or it may be purified by crystallization, or by chromatography.

The thiocarbamates are obtained by the reaction of an isocyanate with an appropriate mercaptan. This is a known method of preparation and is entirely analogous to the even better known reaction of an isocyanate with an alcohol to make urethanes (carbamates).

The following examples illustrate preparation of the compounds of this invention.

EXAMPLE 1

Preparation of N-4-chlorophenylthio-N-methyl S-t-butyl thiocarbamate

An Erlenmeyer flask was charged with 26 g. (0.177 mole) of N-methyl S-t-butyl thiocarbamate dissolved in 100 ml. of dimethylformamide containing 19 g. (0.198 mole) of triethylamine. This solution was cooled to about 0°C. in an ice bath and then 33 g. (0.184 mole) of 4-chlorophenylsulfenyl chloride was added slowly while maintaining the temperature below 10°C. After all the sulfenyl chloride was added, the resulting mixture was stirred for 2 hours. Then 500 ml. of ice water was added, followed by extraction with 3–100 ml. portions of diethyl ether. The combined ether extracts were washed with 100 ml. of water, and were then dried over magnesium sulfate. The dried extracts were filtered and evaporated to give the crude product. This crude product was chromatographed into silica gel using first hexane and then a 1:9 ether:hexane mixture as eluants. The product, 10 g., was obtained from this mixed solvent by evaporation. It had a melting point of 72°–75°C. Analysis:

|   | Calculated | Found |
|---|---|---|
| S % | 22.1 | 21.5 |
| Cl % | 12.2 | 13.3 |

The infrared spectra showed strong adsorptions at 6.0, 6.75, 8.0, 8.65, 9.1 and 9.9 microns.

EXAMPLE 2

Preparation of N-4-chlorophenylthio-N-methyl S-n-butyl thiocarbamate

This reaction was carried out essentially the same as Example 1, except that 25 g. (0.170 mole) of N-methyl S-n-butyl thiocarbamate dissolved in 200 ml. of dimethylformamide containing 10 g. (0.089 mole) of 1,4-diazobicyclo[2,2,0] octane was reacted with 31 g. (0.173 mole) of 4-chlorophenylsulfenyl chloride.

After workup and chromatography the product, 9 g., was obtained as an oily liquid. Analysis:

|   | Calculated | Found |
|---|---|---|
| S % | 22.1 | 21.9 |
| Cl % | 12.2 | 12.7 |

The infrared spectra showed strong adsorption bands at 6.0, 6.75, 7.95, 9.1, and 9.9 microns.

N-methyl-N-p-chlorophenylthio S-p-chlorophenyl thiocarbamate was also prepared in accordance with the above procedures. The melting point was 99°–105°C. The chemical analysis showed:

|   | Calculated | Found |
|---|---|---|
| S % | 18.70 | 18.45 |
| Cl % | 20.6 | 20.4 |

The thiocarbamates of the present invention are, in general, useful in the control of nematodes. The nematocidal activities of the compounds of this invention were determined as follows.

A 0.38 ml. portion of a 3 percent acetone solution of the test compound was diluted with 1 ml. acetone. The resulting solution was homogenously mixed with 20 cc. of vermiculite. The treated vermiculite was then mixed homogenously with 750 g. of soil, dry weight basis, which was severely infested with free-living nematodes (mixed culture of Meloidogyne javanica and Meloidogyne incognita). This mixing gave a concentration of approximately 15 parts of the test compound per million parts of soil. This treated soil was stored for 4 days at 65°–75°F. It was then divided equally into 3 parts, each of which was put into a separate pot and kept for another 3 days. A 3-week old tomato (Bonny Best) seedling was then transplanted into each pot and incubated for 13 days under greenhouse conditions. After this period they were removed and the soil was washed from their roots. The nematocidal effectiveness of the test compound was determined by observing each plant for signs of nematode invasion (number of galls formed, stunting, etc.).

The results of these tests, reported as the average of the 3 replicates on a 0 to 100 basis — 0 indicating no effectiveness; 100 indicating complete effectiveness — are reported in Table I.

TABLE I

| Compound | Nematocidal Activity % Control |
|---|---|
| N-4-chlorophenylthio-N-methyl S-t-butyl thiocarbamate | 80 |
| N-4-chlorophenylthio-N-methyl S-n-butyl thiocarbamate | 100 |
| N-methyl-N-p-chlorophenylthio S-p-chlorophenyl thiocarbamate | 56 |

As illustrated above, the thiocarbamates of this invention may be used to control plant-parasitic nematodes by exposing them to a toxic amount of the thiocarbamates. Thus, these thiocarbamates will normally be applied to nematode-infested soil at dosages in the range of 3 to 40 lbs. per acre. The thiocarbamates are generally admixed with an inert diluent. They may be applied as liquid formulations by spraying or injection. The liquid formulations of these thiocarbamates may be solutions, dispersions, or emulsions. Typical solvents which may be used are aromatics, such as xylene, toluene and benzene, ketones such as cyclohexanone and the like. These liquid formulations will usually contain a wetting agent to facilitate the thiocarbamate's penetration into the soil and generally enhance its effectiveness. They may also be applied as solid formulations containing carriers such as soil, sawdust, clay and the like. When used as a solid, these thiocarbamates will usually be plowed into the soil. Following their application to the soil, the soil will be watered to disperse the thiocarbamates below ground level.

Compounds of the present invention also exhibit some herbicidal activity, particularly post-emergent activity on weeds such as wild oats, watergrass, crabgrass, mustard, pigweed and lambsquarter. Also, N-methyl-N-p-chlorovinylthio S-p-chlorophenyl thiocarbamate shows high control of Euglena.

As will be evident to those skilled in the art, various modifications of this invention can be made or followed, in the light of the foregoing disclosure and discussion, without departing from the spirit or scope of the disclosure or from the scope of the following claims.

We claim:

1. A method for controlling parasitic nematodes which comprises applying to said nematodes or nematode infested environment a nematocidally effective amount of a compound of the formula

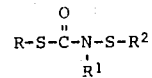

wherein R is alkyl of 1 to 6 carbon atoms, $R^1$ is alkyl of 1 to 4 carbon atoms and $R^2$ is phenyl substituted with 0 to 2 chlorine atoms.

2. The method of claim 1 wherein R is alkyl of 1 to 4 carbon atoms.

3. The method of claim 2 wherein $R^1$ is methyl.

4. The method of claim 3 wherein $R^2$ is chlorophenyl.

5. The method of claim 1 wherein the compound is N-4-chlorophenylthio-N-methyl S-n-butyl thiocarbamate.

6. A nematocidal composition comprising a nematocidally effective amount of a compound of the formula

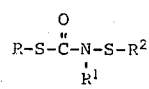

wherein R is alkyl of 1 to 6 carbon atoms, $R^1$ is alkyl of 1 to 4 carbon atoms and $R^2$ is phenyl substituted with 0 to 2 chlorine atoms, and an inert carrier.

7. The nematocidal composition of claim 6 wherein R is alkyl of 1 to 4 carbon atoms.

8. The nematocidal composition of claim 6 wherein $R^1$ is methyl.

9. The nematocidal composition of claim 6 wherein $R^2$ is chlorophenyl.

10. The nematocidal composition of claim 6 wherein said compound is N-4-chlorophenylthio-N-methyl S-n-butyl thiocarbamate.

* * * * *

UNITED STATES PATENT OFFICE
CERTIFICATE OF CORRECTION

Patent No. 3,886,282             Dated May 27, 1975

Inventor(s) Melancthon S. Brown, deceased, and Gustave K. Kohn

It is certified that error appears in the above-identified patent and that said Letters Patent are hereby corrected as shown below:

In Item [75], after "administrator", delete "Berkeley, Calif.," and insert -- and Gustave K. Kohn, Berkeley, Calif., --.

Signed and Sealed this eleventh Day of May 1976

[SEAL]

Attest:

RUTH C. MASON
*Attesting Officer*

C. MARSHALL DANN
*Commissioner of Patents and Trademarks*